Figure 2:
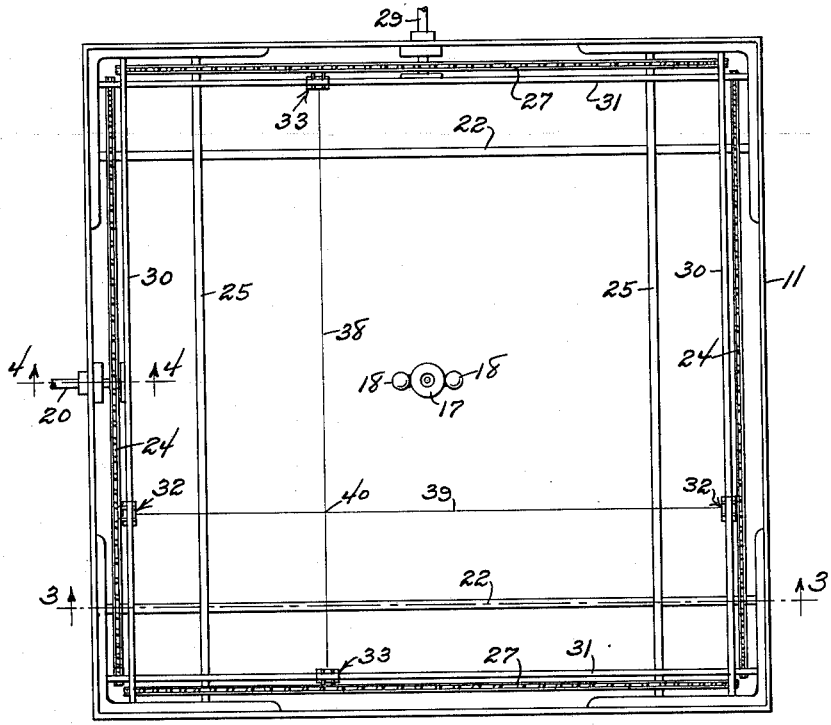

Oct. 20, 1936.  F. A. FOWLER  2,058,306
ROBOT NAVIGATOR
Filed Aug. 10, 1934  4 Sheets-Sheet 1
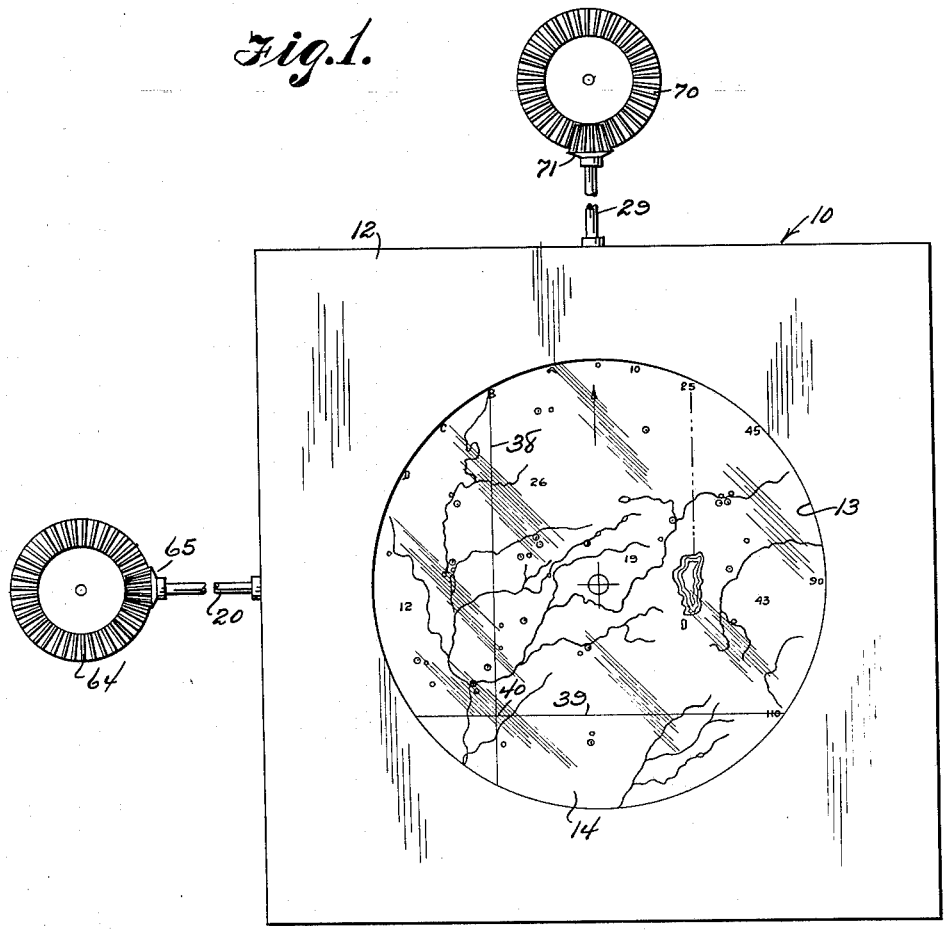
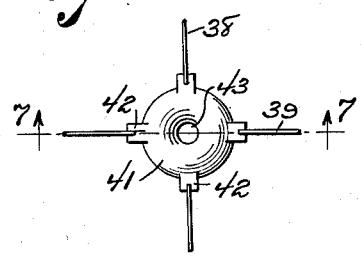
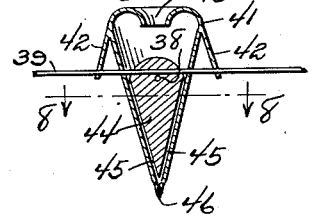
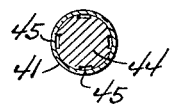
Frederick A. Fowler
INVENTOR
BY Victor J. Evans & Co.
ATTORNEY Oct. 20, 1936.　　　F. A. FOWLER　　　2,058,306
ROBOT NAVIGATOR
Filed Aug. 10, 1934　　　4 Sheets-Sheet 2

Frederick A. Fowler
INVENTOR

BY Victor J. Evans & Co.
ATTORNEY

Oct. 20, 1936.　　　　F. A. FOWLER　　　　2,058,306
ROBOT NAVIGATOR
Filed Aug. 10, 1934　　　4 Sheets-Sheet 3
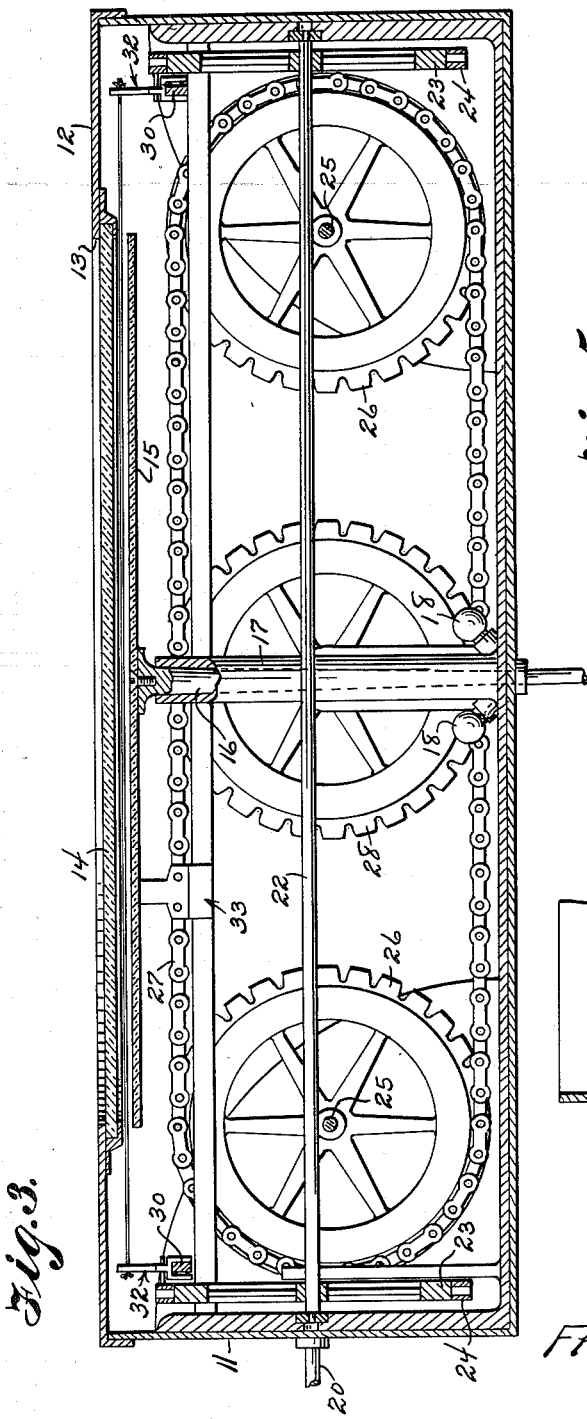
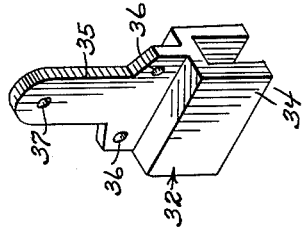
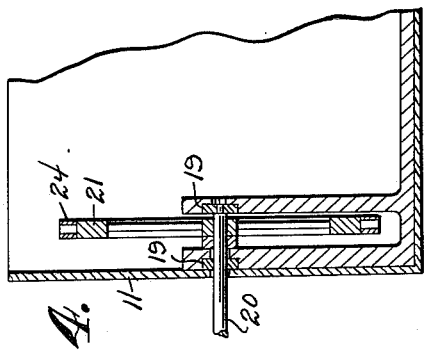
Frederick A. Fowler
INVENTOR
BY Victor J. Evans & Co.
ATTORNEY

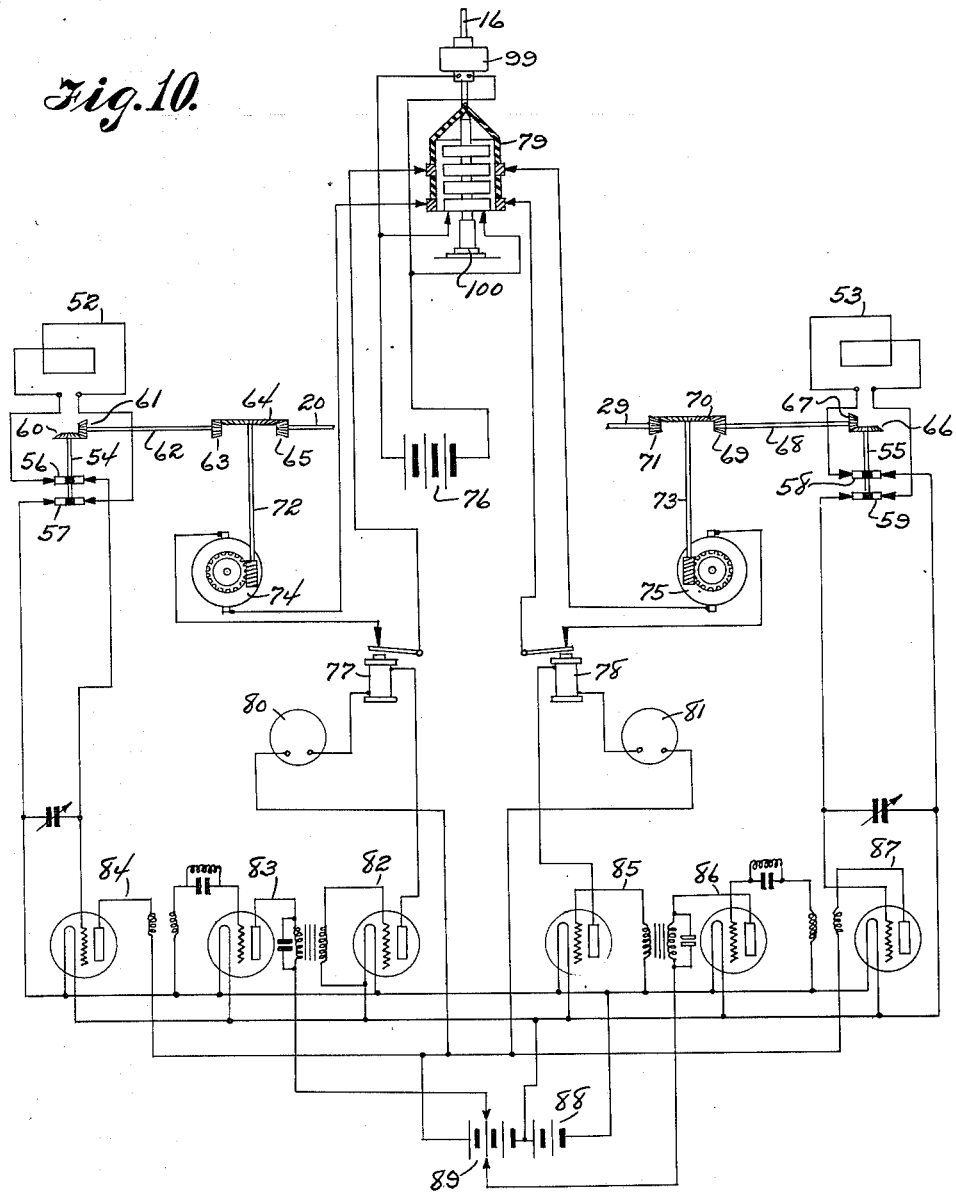

Patented Oct. 20, 1936

2,058,306

UNITED STATES PATENT OFFICE 2,058,306

ROBOT NAVIGATOR

Frederick A. Fowler, Nevada City, Calif.

Application August 10, 1934, Serial No. 739,307

7 Claims. (Cl. 250—11)

This invention relates to apparatus for automatically indicating the position of air or other craft by means of its responsiveness to so-called radio broadcasting or beacon stations sending out so-called selected waves or impulses.

The principal object of the invention, generally stated, is to provide a system or apparatus by means of which it is possible to establish the vertical position, completely and accurately, of air or other craft in relation to the earth's surface and designate correct position at all times while on the course over which the ship, airship or plane is travelling, in any direction.

Another object is to provide a robot navigator embodying the employment on a ship, airship, plane or other movable craft of a point indicator in the nature of a cross formed by cross-hair members travelling over or under the face of a transparent map or dial movable but under the control of a gyroscope and each cross-hair member acting under the influence of a plurality of so-called radio broadcasting or beacon stations, two being sufficient, the combination of the movable point or cross, together with the gyro-controlled map or dial providing a means for accurately determining, by visible indication, the exact position of the ship, airship, plane or other movable craft with respect to the territory travelled over, this movable point or cross indicating to the pilot his position at all times while on his course from one point to another regardless of low visibility.

Another object of the invention is to provide a robot navigator which may be used for charting air lanes and the like and making a permanent record of such for the future control of other robots.

Another object is to provide a robot of this character in which the movable chart or map has located on its face certain marks, figures, landing fields, emergency landing fields, code marks, contours, elevations or any other characteristics required by the pilot of a plane, the location of these various contours and other elements being taken in negative form by actual aerial geographic survey, using a master robot, as above mentioned, equipped with an inking device for this purpose in order to correct possible errors in geographical surveys and compensate for other conceivable errors, the idea being that each subsequently operated robot will, if constructed and adjusted properly, follow the indications and give, by means of its constantly moving point in conjunction with the chart or dial, the same visible indication as that on the corresponding apparatus of the master robot.

A more specific object is to provide a robot navigator embodying a movable dial over which move cross-hair wires arranged at right angles to each other and movable in accordance with the speed of the plane and in response to motor means which must be synchronized with respect to the plane speed, these cross-hair wires having their point of intersection moving constantly over the dial or chart, the position of which is automatically shifted as the ship, airship, plane or movable craft proceeds on the desired course.

Another more specific object is to provide a robot navigator in which the cross-hair wires are moved independently of each other, up or down, across or back, as the case may be, in response to motor means under the control of separate radio compasses each of which must be so constructed that it will answer only to its parent radio controlling station, the two stations emitting systems of impulses or waves of radically different carrier-frequency or wave lengths in such a manner that the impulses from one will not influence the loops of the other radio compass.

It is an established fact that when the loops of a radio compass are normal to the radio waves there will be no current flowing in the radio compass circuit whereas if the plane upon which such radio compass loops are mounted deviates from its course in such manner as to cause an unnormal relation to the radio waves a polarized current will flow in the compass output circuit and I propose to take advantage of these facts by means of relays and auxiliary tube circuits so that one or more other movements can be accomplished such, for instance, as effecting the operation of steering engines or the like for controlling the steering rudder of the plane in case automatic control, instead of mere indication, is desired, it being moreover a feature that such loops may, in accordance with my invention, be manually rotated so as to obtain readings on appropriate meters indicating when the loops have been restored to their normal relation to the radio waves.

An additional object is to provide an apparatus of this character which will be comparatively simple and inexpensive to manufacture, easy to install, automatic and efficient in action, durable in service, and a general improvement in the art.

Figure 9:
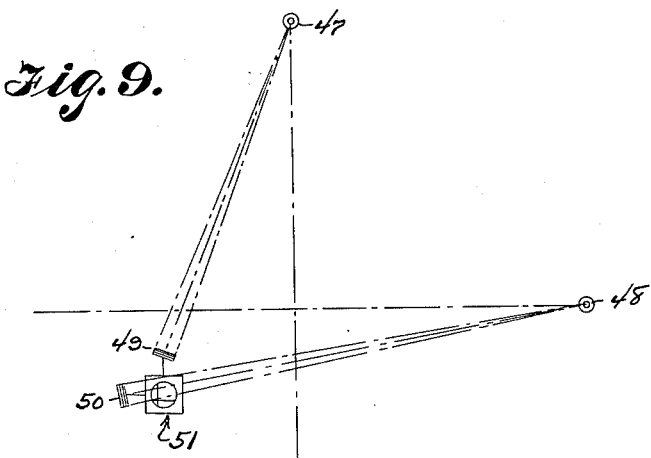

To the attainment of the foregoing and other objects and advantages, the invention preferably consists in the details of construction and the arrangement and combination of parts to be hereinafter more fully described and claimed, and illustrated in the accompanying drawings in which:

Figure 1 is a plan view of the face of the robot,

Figure 2 is a view taken in the same direction but with the cover and dial removed to disclose the interior mechanism, Figure 3 is a cross section taken on the line 3—3 of Figure 2, Figure 4 is a detail section taken on the line 4—4 of Figure 2, Figure 5 is a detail perspective view of one of the cross-hair wire carriers, Figure 6 is a plan view showing an inking mechanism mounted at the intersection of the cross-hair wires, Figure 7 is a cross section taken on the line 7—7 of Figure 6, Figure 8 is a detail section taken on the line 8—8 of Figure 7, Figure 9 is a diagrammatic view illustrating the relation of the robot to a pair of controlling radio stations, Figure 10 is a diagram of the electrical circuits involved.

Referring more particularly to the drawings, I have shown my robot as comprising a casing 11 of appropriate size, dimensions and detailed construction having a cover 12 formed with a sight opening 13 of circular form beneath which is mounted a transparent dial 14 at the underside of which is located a rotatable disk 15 carrying a chart formed as the true geographical representation of the territory travelled over. This disk is represented as carried by a post or shaft 16 mounted within a bearing 17 extending vertically of the casing at its center. The means for rotating this disk will be described hereinafter. In order that the indicia on the disk 15 may be visible at night, it is necessary that the disk be of transparent or at least translucent material and to provide illuminating means such as incandescent bulbs 18 mounted within the casing in any appropriate manner.

Journaled in suitable bearings 19 which are located at one side of the casing and which are preferably jeweled is a shaft 20 on which is mounted a sprocket 21 located, of course, within the casing. Suitably journaled transversely of the casing in parallel relation to the shaft 21 but extending entirely across the casing are shafts 22 upon the ends of which are mounted sprockets 23 over which are trained chains or other flexible members 24. One chain 24 engages with the sprocket 21 so that when the latter is rotated by means to be described the chains 24 will move simultaneously in the same direction and at the same speed.

Journaled near the opposite sides of the casing and extending entirely thereacross at right angles to the shafts 22 are other shafts 25 provided at their ends with sprockets 26 about which are trained chains or other flexible members 27. Engaging one of the chains 27 is a sprocket 28 carried by a suitably journaled shaft 29 which extends through and outwardly beyond one side of the casing. Clearly, when the shaft 29 is rotated the sprocket 28 thereon will drive one chain 27 which will in turn drive the sprockets 26 engaged thereby and effect rotation of the shafts 25 so that the sprockets 26 at the other ends thereof will move the other chain 27. The movement of the chains 27 is independent of that of the chains 23.

Suitably mounted in the casing and located adjacent the chains 24 and chains 27, respectively, are guides 30 and 31 along which are slidably movable pairs of carriages 32 and 33, respectively, and which are secured to the adjacent chains 24 and 27, respectively, by any suitable means, for movement thereby. These carriages are shown in detail in Figure 5 and it will be observed that each is represented as comprising a U-shaped body 34 adapted to straddle the guide 30 or 31 as the case may be, and further including an upstanding ear 35 apertured at 36 for whatever securing means is provided for connection with the adjacent chain or flexible member and additionally apertured at 37 for a reason to be explained. Passing through the holes 37 in the up-standing ears 35 of the carriages 33 is a cross-hair wire 38, and mounted within the holes 37 in the ears 35 of the pair of carriages 32 is a cross-hair wire 39. These two cross-hair wires are always disposed at exact right angles to each other and it is their point 40 of intersection moving along the map disk 15 which indicates the position of the plane or other craft. Clearly, as the shaft 20 is rotated the chains 24 will be moved in synchronism as above explained so that the cross-hair wire 39 will move up or down the casing. Likewise, when the shaft 29 is rotated, the movement of the simultaneously moving chains 27 will cause the cross-hair wire 38 to move back or forth across the casing. The point 40 of intersection is therefore constantly changing as the plane follows its course.

In the case of a master robot which is intended to chart a course or perform some other similar recorded action, it is necessary to provide some sort of inking mechanism. In Figures 6, 7 and 8 I have shown an appropriate device which will be satisfactory for the purpose. Referring to these figures it will be noted that I have shown an inverted cone shaped cup 41 having outstanding lugs 42 which, together with the remainder of the cup, are apertured for the passage of the cross-hair wires 38 and 39. The top of this cone has a filling opening 43 permitting filling with ink and located within this cup is a plug 44 having vertically extending ducts 45 for feeding ink to the nib or point 46 which is supposed to travel over the map disk 15 for making a permanent recordation thereon. It should be understood that this inking device is only an attachment intended to be used in a master robot as in the case of others an inking device is unnecessary as it is the point of intersection 40 cooperating with the map disk for indicating the position of the craft.

In further connection with the movable cross-hair wires, attention is invited to Figure 9 wherein the numerals 47 and 48 designate two radio beacon stations which broadcast preferably free waves emanating in every direction for controlling the robot. The base lines 49 and 50 in this diagram are represented as normal to the radio waves whereas the robot indicated as a whole by the numeral 51 in this figure remains always in the same position, its cross-hair wires being always at right angles to each other regardless of the base lines 49 and 50 and being in parallel relation to the imaginary lines of latitude and longitude. These base lines 49 and 50 are only diagrammatic in this view but in the main diagram, shown in Figure 10, the loops or radio compasses 52 and 53 are located at these lines. These compasses are of conventional construction and are mounted upon rotatable stems or shafts 54 and 55, respectively, suitably journaled on the plane. Associated with the shafts 54 and 55 are conventional types of collector rings, the shaft 54 carrying disks 56 and 57 and the shaft 55 carrying similar disks or contact rings 58 and 59. The shaft 54 is disclosed as carrying a gear 60 meshing with a gear 61 on a shaft 62 in turn carrying a gear 63 meshing with a gear 64 with which in turn meshes a gear 65 on the shaft 20 of the robot. Similarly, the shaft 55 of the radio compass loop 53 carries a gear 66 with which meshes a gear 67 on a shaft 68 carrying a gear 69 meshing with a gear 70 with which engages a gear 71 on the shaft 29 of the robot.

The gears 64 and 70 are represented as carried by shafts 72 and 73, respectively, having any appropriate driven connection with separate motors 74 and 75 of appropriate type which are connected as shown in circuit with a local source of current 76, relays 77 and 78, respectively, and with a gyro motor 79 which is operatively connected with the shaft 16 of the robot. The relays 77 and 78 are connected in series, respectively, with right and left reading meters 80 and 81, of appropriate type. Moreover the relay 77 is connected with the output circuit of an audio frequency amplifier 82 which steps up the current from the detector tube 83 of a radio circuit which also includes a step of radio frequency amplification 84 the input to which is received from the radio compass loop 52. Similarly, the relay 78 is connected with the output circuit from an audio frequency amplifier 85 for stepping up the current of a detector tube circuit 86 with which is associated a radio frequency amplifier 87, the input to which is connected with the collector rings of the radio compass loop 53. The two entirely distinct and separate radio tube circuits may be of any ordinary or preferred design and the circuits are of course energized by A and B batteries 88 and 89, respectively. Details as to the types of tubes employed, the specific circuit connections, condensers and other elements are believed to be unnecessary for the principal reason that they may be conventional and for the additional reason that they may, on the other hand, be varied within very wide limits.

In further connection with the gyro controlled map or disk, attention is invited to Figure 10 wherein the numerals 99 and 100 designate a pole changing controller also under the control of the motor driven gyroscope, but not in its entirety, as the member 100 is secured in a stationary manner and is ship turned, so to speak, while the gyro controlled sleeve keeps its true east, west, north and south position at all times. Pole changing segments on member 100 causes the time geared motors 74 and 75 to rotate in the proper direction causing the cross formed by the cross-hair wires to move in the direction of travel and at the same time cause the antenna loops 52 and 53 to turn backward seeking normal relations with their respective parent controlling stations. Ordinarily this movement must be quite slow, but can be arranged to function quickly as in the case of setting a plane down in a landing field obscured by fog or storm, that might be equipped with short range controllers that will overcome the influence of the long range controlling stations. In this case the map or dial center becomes the center of any landing field so equipped and spot landings can be made if visibility is good for a distance of one hundred feet.

The operation of the apparatus is as follows: When the loops of the radio compasses 52 and 53 are normal to the radio waves emanating from the parent stations 47 and 48 no current will flow in the radio compass circuits and the relays 77 and 78 are open. However, if the plane deviates or moves in such a manner as to cause an unnormal relation, a polarized current will flow in the compass output circuit and by means of the relays 77 and 78 which are thus energized by the output from the amplifying units or circuits 82 and 84 the movement of the cross-hair members can be controlled. Of course, while the plane is travelling, the motors 74 and 75 operate to drive the shafts 20 and 29 of the robot so that the cross-hair wires 38 and 39 will move up or down across or back over the map disk 15, until normal relation of the compass loops have been mechanically reestablished when one or both will come to rest, due to the fact that the radio sensitive relays are now open, caused by the lack of excitation in the radio compasses' output circuits. The two cross-hair wires of the robot moving constantly under the influence of the motors 74 and 75 will cause the point of intersection 40 to move constantly over the gyro controlled map disk or dial which itself is supposed to remain stationary while the plane follows its normal course.

While the radio compass loops may be permitted to operate entirely automatically, it is easily apparent that, if desired, suitable means can be provided whereby they may be moved by hand so that the pilot or observer may adjust them so as to restore their normal relation to the direction of the radio waves, normalcy being indicated by a zero reading on the respective meters 80 and 81, and the cross formed on the face of the map or dial denotes location.

From the foregoing description and a study of the drawings it will be apparent that I have thus provided a very simple visual indicating device which may be used as the control or automatic direction governing mechanism. It will be noted by referring to Figure 1 that the map disk may be provided about its periphery with a number of different indicia and that it is also preferably provided at its center with a cross mark indicating a landing field. The character of the terrain is indicated and various locations, altitudes, etc. are represented as indicated by different numbers, for example it may be conceivable that the point indicated by the numeral 12 on this chart might represent San Francisco while the point indicated at 43 might be New York. Again, the various numbers on the face of the map might indicate high altitudes, thereby apprising the pilot of the fact that it is necessary to fly the plane much higher in order to avoid dangers. Of course the robot is not designed to take into consideration various altitudes as the point is that the intersection 40 of the cross-hair wires of the robot will disclose the vertical position of the plane with respect to the territory travelled over. These numbers on the face of the map might refer to a code book or accompanying chart bearing all sorts of data and information of value to the pilot, which data could not be placed on the face of the map disk on account of the limitations of space thereon. The detailed operation of the robot itself has been described above and need not be repeated and it is believed that the general operation of the various motor circuits, etc. has been explained in sufficient detail to render the operation of the device clearly understandable to one skilled in the art without further description.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A robot navigator and geographical compass for aircraft comprising, in combination, a casing containing a map formed as the true representation of the territory travelled over, cross-hair wires disposed at right angles to each other and movable within said casing over the surface of said map, motor means connected with the respective cross-hair wires for moving the same independently but always at right angles to each other whereby the point of intersection of the cross-hair wires in relation to the map will disclose the exact point of location of the aircraft, and means responsive to radio impulses emanating from parent control stations, and influencing drive means for the cross-hair wires.

2. A robot navigator and geographical compass for aircraft comprising, in combination, a casing containing a map formed as the true representation of the territory travelled over, cross-hair wires disposed at right angles to each other and movable within said casing over the surface of said map, motor means connected with the respective cross-hair wires for moving the same independently but always at right angles to each other whereby the point of intersection of the cross-hair wires in relation to the map will disclose the exact point of location of the aircraft, means responsive to radio impulses emanating from parent control stations and operatively connected with the cross-hair wires to control movement of the same, and means for maintaining the constant directional position of the map independently of the movement of the cross-hair wires for indicating a deviation in the course.

3. A robot navigator and geographical compass for aircraft, comprising a casing having a sight opening, cross-hair wires located at right angles to each other within the casing and visible through said sight opening, a map disk rotatably mounted beneath the cross-hair wires and formed as the representation of the territory travelled over, motor means for moving said cross-hair wires separately, radio compass means mounted on the aircraft and responsive respectively to radio waves emanating from control stations having different characteristics, means under the control of said radio compass means for actuating said motor means, and means for maintaining a constant directional position of the map disk.

4. A robot navigator and geographical compass for aircraft, comprising a casing having a sight opening, cross-hair wires located at right angles to each other within the casing and visible through said sight opening, a map disk rotatably mounted beneath the cross-hair wires and formed as the representation of the territory travelled over, motor means for moving said cross-hair wires separately, radio compass means mounted on the aircraft and responsive respectively to radio waves emanating from control stations having different characteristics, means under the control of said radio compass means for actuating said motor means, and means for maintaining a constant directional position of said map disk, said last named motor means being included in a local circuit embodying relays under the control of and responsive to the radio compasses.

5. A robot navigator and geographical compass for aircraft comprising a casing containing a movably mounted map formed as the representation of the territory travelled over by the craft, means to maintain a constant directional position of the map, cross-hair wires located within said casing at right angles to each other and having their point of intersection traversing said map, motor means for moving the cross-hair wires individually, radio compass loops rotatably mounted on the craft and included in separate radio receiving circuits responsive to impulses emanating from separate control stations having different characteristics, relays interposed in said receiving circuits for actuation thereby, and motor means located in circuit with a local source of current under the control of said relays and operatively connected with said cross-hairs for moving the same and indicating location in the course of the craft.

6. A robot navigator and geographical compass for aircraft comprising a casing having a sight opening, a disk rotatably mounted beneath said sight opening and carrying a map representing territory travelled over by the craft, means for maintaining a constant directional position of the map, a pair of flexible members located within opposite sides of the casing and trained about drive members, a second pair of flexible members located within the other opposite sides of the casing, separate means for driving the respective pairs of flexible members, separate means for driving the second named pair of flexible members, and cross-hair wires bridging the respective pairs of flexible members and disposed at right angles to each other whereby they will be constantly moved in accordance with the direction of the plane whereby the point of intersection of the cross-hair wires will traverse the map.

7. A robot navigator and geographical compass for aircraft comprising a casing having a sight opening, a disk rotatably mounted beneath said sight opening and carrying a map representing territory travelled over by the craft, means for maintaining a constant directional position of the map, a pair of flexible members located within opposite sides of the casing and trained about drive members, a second pair of flexible members located within the other opposite sides of the casing, separate means for driving the respective pairs of flexible members, separate means for driving the second named pair of flexible members, cross-hair wires bridging the respective pairs of flexible members and disposed at right angles to each other whereby they will be constantly moved in accordance with the direction of the plane whereby the point of intersection of the cross-hair wires will traverse the map, and independent means responsive to changes in the course of the plane for controlling the movement of said cross-hair wires.

FREDERICK A. FOWLER.